(12) United States Patent
Barber, Jr.

(10) Patent No.: US 6,979,713 B2
(45) Date of Patent: Dec. 27, 2005

(54) CURABLE COMPOSITIONS AND ABRASIVE ARTICLES THEREFROM

(75) Inventor: Loren L. Barber, Jr., Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 183 days.

(21) Appl. No.: 10/303,222

(22) Filed: Nov. 25, 2002

(65) Prior Publication Data

US 2004/0101680 A1 May 27, 2004

(51) Int. Cl.[7] .................. C08G 18/62; C08G 18/80; B24D 3/34
(52) U.S. Cl. .............. 525/124; 525/123; 525/125; 525/127; 525/131; 51/298; 428/423.1; 442/327; 15/104.001; 216/52; 451/466
(58) Field of Search .................. 525/123, 124, 525/125, 127, 131

(56) References Cited

U.S. PATENT DOCUMENTS

| | | |
|---|---|---|
| 2,958,593 A | 11/1960 | Hoover et al. |
| 3,225,916 A | 12/1965 | Field et al. |
| 3,971,745 A | 7/1976 | Carlson et al. |
| 4,018,575 A | 4/1977 | Davis et al. |
| 4,190,567 A | 2/1980 | Ohmura et al. |
| 4,227,350 A | 10/1980 | Fitzer |
| 4,306,998 A | 12/1981 | Wenzel et al. |
| 4,314,827 A | 2/1982 | Leitheiser et al. |
| 4,331,453 A | 5/1982 | Dau et al. |
| 4,355,489 A | 10/1982 | Heyer et al. |
| 4,357,441 A | 11/1982 | Hamamura et al. |
| 4,486,200 A | 12/1984 | Heyer et al. |
| 4,518,397 A | 5/1985 | Leitheiser et al. |
| 4,522,851 A | 6/1985 | Rosthauser |
| 4,524,104 A * | 6/1985 | Hagio et al. ............. 428/341 |
| 4,588,419 A | 5/1986 | Caul et al. |
| 4,609,380 A | 9/1986 | Barnett et al. |
| 4,623,364 A | 11/1986 | Cottringer et al. |
| 4,652,275 A | 3/1987 | Bloecher et al. |
| 4,734,104 A | 3/1988 | Broberg |
| 4,737,163 A | 4/1988 | Larkey |
| 4,744,802 A | 5/1988 | Schwabel |
| 4,751,137 A | 6/1988 | Halg et al. |
| 4,770,671 A | 9/1988 | Monroe et al. |
| 4,799,939 A | 1/1989 | Bloecher et al. |

(Continued)

FOREIGN PATENT DOCUMENTS

| | | |
|---|---|---|
| DE | 2013860 | 9/1970 |
| DE | 42 23 183 C1 | 7/1993 |
| EP | 0 653 468 A2 | 5/1995 |
| JP | 51086593 A | 7/1976 |
| JP | 53033251 A | 3/1978 |
| JP | S 56-74144 | 6/1981 |
| JP | S 62-151419 | 7/1987 |
| JP | 11-207639 | 8/1999 |
| WO | WO 94/26468 | 11/1994 |
| WO | WO 00/39181 | 7/2000 |

OTHER PUBLICATIONS

Wicks et al., "Blocked isocyanates III: Part A. Mechanisms and chemistry", ELSEVIER, Progress in Organic Coatings 36 (1999), pp. 148–172.

Wicks et al., "Blocked isocyanates III: Part B: Uses and applications of blocked isocyanates", ELSEVIER, Progress in Organic Coatings 41 (2001), pp. 1–83.

(Continued)

*Primary Examiner*—Kelechi C. Egwim

(57) ABSTRACT

A curable composition comprises: blocked polyisocyanate, curative, and a crosslinked copolymer of monomers comprising at least one free-radically polymerizable carboxylic acid and at least one of an alkyl or alkaryl(meth)acrylate. Methods of making the curable compositions and their use in the manufacture of abrasive articles are also disclosed.

22 Claims, 2 Drawing Sheets

U.S. PATENT DOCUMENTS

| | | |
|---|---|---|
| 4,800,685 A | 1/1989 | Haynes, Jr. |
| 4,826,894 A | 5/1989 | Markusch et al. |
| 4,835,210 A | 5/1989 | Chin et al. |
| 4,842,619 A | 6/1989 | Fritz et al. |
| 4,881,951 A | 11/1989 | Wood et al. |
| 4,898,597 A | 2/1990 | Hay et al. |
| 4,927,431 A | 5/1990 | Buchanan et al. |
| 4,933,373 A | 6/1990 | Moren |
| 4,991,362 A | 2/1991 | Heyer et al. |
| 5,011,508 A | 4/1991 | Wald et al. |
| 5,078,753 A | 1/1992 | Broberg et al. |
| 5,090,968 A | 2/1992 | Pellow |
| 5,108,463 A | 4/1992 | Buchanan |
| 5,137,542 A | 8/1992 | Buchanan et al. |
| 5,139,978 A | 8/1992 | Wood |
| 5,152,917 A | 10/1992 | Pieper et al. |
| 5,201,916 A | 4/1993 | Berg et al. |
| 5,203,884 A | 4/1993 | Buchanan et al. |
| 5,227,104 A | 7/1993 | Bauer |
| 5,273,558 A | 12/1993 | Nelson et al. |
| 5,282,875 A | 2/1994 | Wood et al. |
| 5,290,903 A | 3/1994 | Hsu et al. |
| 5,306,319 A | 4/1994 | Krishnan et al. |
| 5,328,716 A | 7/1994 | Buchanan |
| 5,342,888 A * | 8/1994 | Sudo .......................... 525/124 |
| 5,366,523 A | 11/1994 | Rowenhorst et al. |
| 5,378,251 A | 1/1995 | Culler et al. |
| 5,378,252 A | 1/1995 | Follensbee |
| 5,417,726 A | 5/1995 | Stout et al. |
| 5,429,647 A | 7/1995 | Larmie |
| 5,436,063 A | 7/1995 | Follett et al. |
| 5,482,756 A | 1/1996 | Berger et al. |
| 5,490,878 A | 2/1996 | Peterson et al. |
| 5,492,550 A | 2/1996 | Krishnan et al. |
| 5,496,386 A | 3/1996 | Broberg et al. |
| 5,498,269 A | 3/1996 | Larmie |
| 5,520,711 A | 5/1996 | Helmin |
| 5,549,962 A | 8/1996 | Holmes et al. |
| 5,551,963 A | 9/1996 | Larmie |
| 5,554,068 A | 9/1996 | Carr et al. |
| 5,556,437 A | 9/1996 | Lee et al. |
| 5,560,753 A | 10/1996 | Schnabel et al. |
| 5,563,193 A | 10/1996 | Abel et al. |
| 5,573,619 A | 11/1996 | Benedict et al. |
| 5,578,096 A | 11/1996 | Christianson et al. |
| 5,584,897 A | 12/1996 | Christianson et al. |
| 5,591,239 A | 1/1997 | Larson et al. |
| 5,609,706 A | 3/1997 | Benedict et al. |
| 5,672,186 A | 9/1997 | Chesley et al. |
| 5,681,361 A | 10/1997 | Sanders, Jr. |
| 5,681,612 A | 10/1997 | Benedict et al. |
| 5,700,302 A | 12/1997 | Stoetzel et al. |
| 5,712,210 A | 1/1998 | Windisch et al. |
| 5,807,913 A | 9/1998 | Mikuni et al. |
| 5,852,120 A * | 12/1998 | Bederke et al. ............. 525/124 |
| 5,858,140 A | 1/1999 | Berger et al. |
| 5,919,549 A | 7/1999 | Van et al. |
| 5,924,917 A | 7/1999 | Benedict et al. |
| 5,928,070 A | 7/1999 | Lux |
| 5,942,015 A | 8/1999 | Culler et al. |
| 5,954,844 A | 9/1999 | Law et al. |
| 5,961,674 A | 10/1999 | Gagliardi et al. |
| 5,975,988 A | 11/1999 | Christianson |
| 6,007,590 A | 12/1999 | Sanders, Jr. |
| 6,017,831 A | 1/2000 | Beardsley et al. |
| 6,059,850 A | 5/2000 | Lise et al. |
| 6,066,188 A | 5/2000 | Benedict et al. |
| 6,117,931 A | 9/2000 | Rehfuss et al. |
| 6,207,246 B1 | 3/2001 | Moren et al. |
| 6,210,840 B1 | 4/2001 | Usami et al. |
| 6,261,682 B1 | 7/2001 | Law |
| 6,288,176 B1 | 9/2001 | Hsieh et al. |
| 6,302,930 B1 | 10/2001 | Lux |
| 6,328,773 B1 | 12/2001 | Beardsley et al. |
| 6,635,314 B1 | 10/2003 | William et al. |
| 2002/0065031 A1 | 5/2002 | Chou et al. |

OTHER PUBLICATIONS

Product Information: "Carbopol® Polymers Can Thicken Without Neutralization", Noveon™, The Speciality Chemicals Innovator©, TDS 43, Jan. 2002.

Product Information: "Carbopol® Polymers in Pharmaceuticals", Carbopol® Polymers, pp. 1–2, http://www.pharma.noveoninc.com/products/carbopol.htm, Nov. 13, 2002.

Product Information: "Creating Emulsions with Carbopol 1600–Series Polymers", Carbopol® High Performance Polymers for Industrial Specialties, Bulletin IS–9, Revised 4–92, pp. 1–5.

Product Information "Dispersion Techniques for Carbopol® Resins", Noveon™, The Specialty Chemicals Innovator©, TDS 103, Rev. Oct. 1993.

Huibers et al., "Evidence for Synergism in Nonionic Surfactant Mixtures: Enhancement of Solubilzation in Water–in–Oil Microemulsions", Langmuir 1997, 13, pp. 5762–5765.

Product Information: "How to Prepare Aqueous Dispersions of Carbopol® Resins", Noveon™, The Specialty Chemicals Innovator©, TDS 61, Revised 10/93.

Product Information: "Introducing Pemulen® Polymeric Emulsifiers", Noveon™, The Specialty Chemicals Innovator©, TDS 114, Jan. 2002.

Product Information: Material Safety Data Sheet, "ADIPRENE BL–16", Uniroyal Chemical, Oct. 25, 1985.

Product Information: Material Safety Data Sheet, "ADIPRENE BL–31", Crompton/Uniroyal Chemical, Witco and OSI Specialties Products & Services, Jun. 1, 2000.

Product Information: Solutions Close to Home, "Molecular Weight Of Carbopol® and Pemulen® Polymers", Noveon™, The Specialty Chemicals Innovator©, TDS #222, Rev. 12/99.

Product Information: Polymers for Personal Care, "Neutralizing Carbopol® and Pemulen® Polymers in Aqueous and Hydroalcoholic Systems", Noveon™, The Specialty Chemicals Innovator©, TDS #237, Rev. 10/98.

Product Information: Pemulen® Polymeric Emulsifiers, "Pemulen® Polymeric Emulsifiers in Pharmaceuticals", pp. 1–2, http://www.pharma.noveoninc.com/products/pemulen.htm, Nov. 13, 2002.

Product Information: Noveon™, Pemulen® Resins, Industrial Specialties, "Pemulen Resins/The Universal Emulsifiers For Oil–in–Water Emulsions", 1998.

Product Information: Noveon Home Care, Products for Home Care and I and I Applications, Pemulen® 1622 Polymeric Emulsifier, http://www.homecare.noveoninc.com/products/pemulen1622.html, Aug. 6, 2002.

Product Information: Solutions Close to Home, "Pemulen® 1622 Polymeric Emulsifier For Home Care and Industrial & Institutional Applications", Noveon™, The Specialty Chemicals Innovator©, PDS Pemulen 1622, Rev. 11/99.

Product Information: "Pemulen® 1622 Polymeric Emulsifier", Noveon™, The Specialty Chemicals Innovator, 2001.

Becher et al., "The Determination of Hydrophile–Lipophile Balance by Gas–Liquid Chromatography", Presented at National Colloid Symposium, Ottawa, Jun., 1963.

* cited by examiner

CURABLE COMPOSITIONS AND ABRASIVE ARTICLES THEREFROM

TECHNICAL FIELD

The present invention relates to curable compositions. The present invention also relates to curable compositions used in the manufacture of abrasive articles.

BACKGROUND

Polyurethanes (i.e., polymers containing urethane and/or urea linkages in the backbone chain) are widely used as binder materials for many applications due to their physical properties (e.g., strength, elongation, and/or toughness). Many polyurethane binders are formed by curing (i.e., at least partially polymerizing and/or crosslinking) polyurethane precursors.

For some applications in which polyurethane binders are used (e.g., applications in which the polyurethane may rub against a workpiece), it is desirable to reduce the coefficient of friction of the binder to prevent wear of the binder and/or transfer of the binder to a workpiece (i.e., smearing). The reduction of smearing may be particularly important in the manufacture and use of abrasive articles.

It would be desirable to have curable compositions that are useful as binder precursors. Alternatively, or in addition, it would also be desirable if such curable compositions could be cured to provide binders having one or more physical properties of polyurethanes while having a low coefficient of friction and/or tendency to smear.

SUMMARY

In one aspect, the present invention provides a curable composition comprising:
blocked polyisocyanate;
curative; and
a crosslinked copolymer of monomers comprising at least one free-radically polymerizable carboxylic acid and at least one of an alkyl or alkaryl(meth)acrylate, wherein at least one of the alkyl or alkaryl (meth)acrylate has from 11 carbon atoms to 34 carbon atoms.

In another aspect, the present invention provides a curable composition preparable from components comprising:
blocked polyisocyanate;
curative; and
a crosslinked copolymer of monomers comprising at least one free-radically polymerizable carboxylic acid and at least one of an alkyl or alkaryl(meth)acrylate, wherein at least one of the alkyl or alkaryl (meth)acrylate has from 11 carbon atoms to 34 carbon atoms.

In another aspect, the present invention provides a composition comprising a polymerized reaction product of components comprising:
blocked polyisocyanate;
curative; and
a crosslinked copolymer of monomers comprising at least one free-radically polymerizable carboxylic acid and at least one of an alkyl or alkaryl(meth)acrylate, wherein at least one of the alkyl or alkaryl (meth)acrylate has from 11 carbon atoms to 34 carbon atoms.

In another aspect, the present invention provides a composition comprising a polymerized reaction product of a curable composition preparable from components comprising:
blocked polyisocyanate;
curative; and
a crosslinked copolymer of monomers comprising at least one free-radically polymerizable carboxylic acid and at least one of an alkyl or alkaryl(meth)acrylate, wherein at least one of the alkyl or alkaryl (meth)acrylate has from 11 carbon atoms to 34 carbon atoms.

In another aspect, the present invention provides a method for making a curable composition comprising mixing components comprising:
blocked polyisocyanate;
curative; and
a crosslinked copolymer of monomers comprising at least one free-radically polymerizable carboxylic acid and at least one of an alkyl or alkaryl (meth)acrylate, wherein at least one of the alkyl or alkaryl(meth)acrylate has from 11 carbon atoms to 34 carbon atoms.

In another aspect, the present invention provides an abrasive article comprising abrasive particles and a polymerized reaction product of a curable composition according to the present invention.

In another aspect, the present invention provides a method of abrading a workpiece comprising:
providing an abrasive article comprising:
abrasive particles and a polymerized reaction product according to the present invention; and
frictionally contacting at least one abrasive particle with at least a portion of the surface of the workpiece; and
moving at least one of the at least one abrasive particle or the workpiece relative to the other to abrade at least a portion of the surface.

In another aspect, the present invention provides an abrasive article comprising abrasive particles and a polymerized reaction product of a curable composition according to the present invention.

Curable compositions prepared in accordance with the present invention may typically be cured to form binders having one or more physical properties of polyurethanes while having a low coefficient of friction and/or tendency to smear. Useful abrasive articles, which may be made with curable compositions according to the present invention, include, for example, coated abrasive articles, nonwoven abrasive articles, and bonded abrasive articles.

BRIEF DESCRIPTION OF THE DRAWING

FIG. 3b is an enlarged view of a region of the nonwoven abrasive article shown in FIG. 3a;

DETAILED DESCRIPTION

Figure 1:
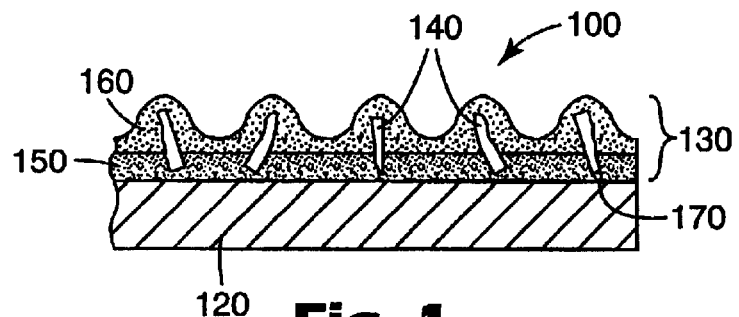
FIGS. 1 and 2 are cross-sectional views of exemplary coated abrasive articles according to the present invention.

Curable compositions according to present invention comprise blocked polyisocyanate, curative, and a crosslinked copolymer of monomers comprising a free-radically polymerizable carboxylic acid and at least one of an alkyl or alkaryl (meth)acrylate, wherein at least one of the alkyl or alkaryl(meth)acrylate has from 11 carbon atoms to 34 carbon atoms.

As used herein, the term "blocked polyisocyanate" refers to either a single blocked polyisocyanate or a mixture of two or more blocked polyisocyanates; the term "curative" refers to either a single curative or a mixture of two or more curatives; and the term "(meth)acryl" encompasses "acryl" and/or "methacryl" (e.g., "(meth)acrylate" encompasses acrylate and/or methacrylate). Further, numerical ranges recited herein are inclusive of their endpoints, unless otherwise specified.

Useful blocked polyisocyanates include polyisocyanates (sometimes referred to in the art as "urethane prepolymers") wherein at least some (e.g., substantially all) of the isocyanate groups have been reacted (i.e., blocked) with a compound (i.e., blocking agent) that forms an adduct with isocyanate groups. Typically, the adduct is substantially unreactive to isocyanate reactive compounds (e.g., amines, alcohols, thiols, etc.) under ambient conditions (e.g., temperatures in a range of from about 20° C. to about 25° C.), but upon application of sufficient thermal energy in the presence of curative, the adduct typically reacts with the curative to form a covalent bond. Procedures and materials for blocking polyisocyanates are well known in the art, and are described, for example, by D. A. Wicks and Z. W. Wicks, Jr. in "Blocked isocyanates III: Part A. Mechanisms and chemistry", Progress in Organic Coatings, vol. 36(1999), Elsevier Science, New York, pages 148–172;and in "Blocked isocyanates III Part B: Uses and applications of blocked isocyanates", Progress in Organic Coatings, vol. 41(2001), Elsevier Science, New York, pages 1–83, the disclosures of which are incorporated herein by reference.

Exemplary blocking agents include ketoximes (e.g., 2-butanone oxime); lactams (e.g., epsiloncaprolactam); malonic esters (e.g., dimethyl malonate and diethyl malonate); pyrazoles (e.g., 3,5-dimethylpyrazole); alcohols including tertiary alcohols (e.g., t-butanol or 2,2-dimethylpentanol), phenols (e.g., alkylated phenols), and mixtures of alcohols as described, for example in U.S. Pat. No. 6,288,176B1 (Hsieh et al.), the disclosure of which is incorporated herein by reference.

Useful polyisocyanates include, for example, aliphatic polyisocyanates (e.g., hexamethylene diisocyanate or trimethylhexamethylene diisocyanate); alicyclic polyisocyanates (e.g., hydrogenated xylylene diisocyanate or isophorone diisocyanate); aromatic polyisocyanates (e.g., tolylene diisocyanate or 4,4'-diphenylmethane diisocyanate); adducts of any of the foregoing polyisocyanates with a polyhydric alcohol (e.g., a diol, low molecular weight hydroxyl group-containing polyester resin, water, etc.); adducts of the foregoing polyisocyanates (e.g., isocyanurates, biurets); and mixtures thereof.

Useful commercially available polyisocyanates include, for example, those available under the trade designation "ADIPRENE" from Uniroyal Chemical Company, Middlebury, Connecticut (e.g., "ADIPRENE L 0311", "ADIPRENE L 100", "ADIPRENE L 167", "ADIPRENE L 213", "ADIPRENE L 315", "ADIPRENE L 680", "ADIPRENE LF 1800A", "ADIPRENE LF 600D", "ADIPRENE LFP 1950A", "ADIPRENE LFP 2950A", "ADIPRENE LFP 590D", "ADIPRENE LW 520", and "ADIPRENE PP 1095"); polyisocyanates available under the trade designation "MONDUR" from Bayer Corporation, Pittsburgh, Pennsylvania (e.g., "MONDUR 1437", "MONDUR MP-095", or "MONDUR 448"); and polyisocyanates available under the trade designations "AIRTHANE" and "VERSATHANE" from Air Products and Chemicals, Allentown, Pa. (e.g., "AIRTHANE APC-504", "AIRTHANE PST-95A", "AIRTHANE PST-85A", "AIRTHANE PET-91A", "AIRTHANE PET-75D", "VERSATHANE STE-95A", "VERSATHANE STE-P95", "VERSATHANE STS-55", "VERSATHANE SME-90A", and "VERSATHANE MS-90A").

Exemplary useful commercially available blocked polyisocyanates include those marketed by Uniroyal Chemical Company under the trade designations "ADIPRENE BL 11", "ADIPRENE BL 16", "ADIPRENE BL 31", "ADIPRENE BL 40", "ADIPRENE BL 45", "ADIPRENE BL 46", "ADIPRENE BLM 500", "ADIPRENE BLP 60", or "ADIPRENE BLP 65", and blocked polyisocyanates marketed by Baxenden Chemicals, Ltd., Accrington, England available under the trade designation "TRIXENE" (e.g., "TRIXENE BI 7986", "TRIXENE BI 7985", "TRIXENE BI 7951", "TRIXENE BI 7950", "TRIXENE BI 7960", or "TRIXENE BI 7770").

In some embodiments according to the present invention, the blocked isocyanate may have the formula:

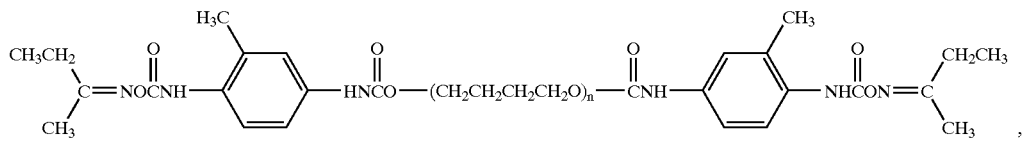

wherein n is an integer greater than or equal to 1, for example, n may be in a range of from 7to 25, although higher and lower values of n may also be useful. Blocked isocyanates described by this formula include, for example, those marketed under the trade designation "ADIPRENE BL 11", "ADIPRENE BL 16", "ADIPRENE BL 31" by Uniroyal Chemical Company.

Typically, the amount of blocked isocyanate is in a range of from 5 percent by weight to 90 percent by weight, based on the total weight of the curable composition, although higher and lower other amounts may be used. For example, blocked isocyanate may be present in an amount in a range of from 10 percent by weight to 80 percent by weight, and/or in a range of from about 40 percent by weight to about 80 percent by weight, based on the total weight of the curable composition.

Typically, a curative is a substance having a plurality of active hydrogen sites such as may be provided by —OH, —NH$_2$, —SH groups, or the like. Useful curatives include, for example, polyamines (e.g., 4,4'-methylenedianiline, 3-aminomethyl-3,5,5-trimethylcyclohexylamine (i.e., isophoronediamine), trimethylene glycol di-p-aminobenzoate, bis(o-aminophenylthio)ethane, and 4,4'-methylenebis(dimethyl anthranilate)), and polyols (e.g., 1,4-butanediol, 1,6-hexanediol, pentaerythritol). Mixtures of polyamines, polyols, and/or mixtures of polyamines with polyols may be useful, for example, to modify reaction rates as required by the intended use.

The curative may comprise an aromatic diamine such as for example bis(4-amino-3-ethylphenyl)methane (marketed under the trade designation "KAYAHARD AA" by Nippon Kayaku Company, Ltd., Tokyo, Japan) or bis(4-amino-3,5-diethylphenyl)methane (marketed under the trade designation "LONZACURE M-DEA" by Lonza, Ltd., Basel, Switzerland). Typically, curative should be present in an amount effective (i.e., an effective amount) to cure the blocked polyisocyanate to the degree required by the intended application; for example, in a stoichiometric ratio of curative to blocked isocyanate in a range of from 0.75 to 1.25 and/or in a range of from 0.95 to 1.190, although stoichiometric ratios outside this range may also be used.

Useful free-radically polymerizable carboxylic acids have at least one carboxyl group covalently bonded to a polymerizable carbon-carbon double bond. As used herein, the term "carboxylic acid" encompasses the corresponding conjugate base (i.e., carboxylate). Exemplary free-radically polymerizable carboxylic acids include itaconic acid, (meth)acrylic acid, maleic acid, fumaric acid, salts of the foregoing, and mixtures thereof. The phrase "copolymer of monomers comprising" is refers to the structure of the copolymer rather than any particular method of preparing the copolymer. For example, the copolymer may be prepared using a monomer (e.g., maleic anhydride) that on hydrolysis (before or after co-polymerization) results in a free-radically polymerizable carboxylic acid. In order to ensure good swellability of the crosslinked copolymer with water, the acid content typically falls in a range of from about 40 percent to about 90 percent by weight (e.g., in a range of from 50 to 70 percent by weight) of the crosslinked copolymer, although acid content values outside this range may also by useful.

Useful alkyl and alkaryl(meth)acrylates have from 11 carbon atoms to 34 carbon atoms, and may be linear or branched. Examples of useful alkyl and alkaryl (meth)acrylates include octyl(meth)acrylate, isooctyl(meth)acrylate, octadecyl (meth)acrylate, tridecyl(meth)acrylate, and nonylphenyl acrylate.

Optionally, additional co-monomers (e.g., (meth)acrylamide, butyl(meth)acrylate) may be included in the crosslinked copolymer.

Crosslinking is typically accomplished by inclusion of a monomer having multiple free-radically polymerizable groups (i.e., polyfunctional monomer) in the monomer mixture prior to copolymerization, although other methods may be used. Useful polyfunctional monomers are well known and include, for example, pentaerythritol trivinyl ether, ethylene glycol divinyl ether, and 1,6-hexanediol diacrylate. The amount of crosslinking desired will determine the amount of polyfunctional monomer used. In order to ensure good swellability with water, the crosslink density should typically be kept at very low level, with value of $M_c$ the average molecular weight of segments between crosslinks of greater than 1000g/mole, greater than 2000 g/mole, and/or greater than 3000 g/mole.

Examples of useful commercially available crosslinked copolymers include, for example, those marketed by Noveon, Inc., Cleveland, Ohio under the trade designations "CARBOPOL" and "PEMULEN" (e.g., "CARBOPOL 674 POLYMER", "CARBOPOL 676 POLYMER", "° CARBOPOL 934 POLYMER", "CARBOPOL 940 POLYMER", "CARBOPOL 941 POLYMER", "CARBOPOL 980 POLYMER ", "CARBOPOL 981 POLYMER", "CARBOPOL 1342 POLYMER", "CARBOPOL 1610 POLYMER", "PEMULEN 1621 RESIN ", "PEMULEN 1622 RESIN", "CARBOPOL 1623 POLYMER", "CARBOPOL 2984 POLYMER", and "CARBOPOL 5984 POLYMER").

The crosslinked copolymer may be present in the curable composition and/or cured composition in an amount of from at least 0.001 percent by weight, at least 0.1 percent by weight, at least 1 percent by weight, at least 5 percent by weight, up to about 10 percent by weight, 20 percent by weight, 30 percent by weight, 40 percent by weight, or even higher, based on the total weight of the curable composition.

Typically, the crosslinked copolymer is in the form of particles, for example having an average dry (i.e., non-swelled) particle size in a range of from about 0.1 micrometers to about 10 micrometers, or in a range of from about 2 micrometers to about 7 micrometers, although larger and smaller particles may also be used.

Optionally, curable compositions according to the present invention may contain at least one organic solvent. The amount of organic solvent is typically chosen based on considerations such as, for example, the desired viscosity of the curable composition. Exemplary classes of organic solvents include alkanes, alcohols, ketones, esters, and ethers In some embodiments according to the present invention, curable compositions are free of added filler and/or grinding aid. Such curable compositions may be useful, for example, for preparing abrasive articles that exhibit abrasive properties comparable to commercially available abrasive articles with binders that include fillers and/or grinding aids. As used herein, the term "free of added filler and/or grinding aid" means that such materials are either wholly absent or present in sufficiently small amounts that they do not exhibit a change of more than five percent in mechanical (i.e., tensile stress and elongation) or abrasive properties (i.e., cut and wear) of the cured composition.

Curable compositions according to the present invention may optionally include at least one, optionally curable, additional polymer or polymer precursor. Exemplary optional additional polymers and/or polymer precursors include phenolic resins, urea-formaldehyde resins, melamine-formaldehyde resins, urethane resins, acrylate resins, polyester resins, aminoplast resins having pendant alpha, beta-unsaturated carbonyl groups, epoxy resins, acrylated urethanes, acrylated epoxies, and combinations thereof.

Optionally, curable compositions may be mixed with and/or include one or more additives. Exemplary additives include fillers, coupling agents, plasticizers, surfactants, lubricants, colorants (e.g., pigments), bactericides, fungicides, grinding aids, and antistatic agents.

Curable compositions according to the present invention may be prepared, for example, by heating, individually or in combination, blocked polyisocyanate and curative to a temperature in a range of from about 50° C. to about 70° C., and combining them. The exact temperature is not critical as long as the combination of blocked polyisocyanate and curative forms a reasonably uniform mixture. If using low viscosity components, the curable composition may be prepared without heating, although heating may be used.

The blocked polyisocyanate, acidic copolymer, and optional components (e.g., organic solvent, curative, other additives) may be combined using well-known mixing techniques (e.g., a motorized mixer having a propeller blade).

In some aspects according to the present invention, abrasive particles may be added to curable compositions of the present invention.

Curable compositions according to the invention may be applied to a substrate by any method known for applying a composition including spraying, roll coating, gravure coating, dip coating, curtain coating, die coating, and the like.

Once applied to a substrate, curable compositions according to the present invention may be at least partially dried to remove optional organic solvent. Drying may be accomplished, for example, by evaporation, preferably at elevated temperature (i.e., above ambient temperature, for example, in a range of from about 50° C. to about 120° C.). After sufficient optional organic solvent has been removed, the remaining components are typically at least partially cured by application of thermal energy (e.g., at a temperature greater than about 120° C., although other curing temperatures may be utilized). Typically, drying and curing may be performed sequentially, or as a single process step. Exemplary useful sources of thermal energy includes ovens, heated rolls, and/or infrared lamps. If desired, further application of thermal energy (e.g., by heating to a higher temperature) may also be desirable to improve binder properties.

Curable compositions according to the present invention may be used to prepare protective coatings, binders (e.g., for nonwoven articles), and the like. Further, curable compositions according to the present invention may be used to prepare abrasive articles such as, for example, coated abrasive articles, nonwoven abrasive articles, bonded abrasive articles, and/or abrasive brushes.

In general, coated abrasive articles have abrasive particles secured to a backing. More typically, coated abrasive articles comprise a backing having two major opposed surfaces and an abrasive coat secured to a major surface. The abrasive coat is typically comprised of abrasive particles and a binder, wherein the binder serves to secure the abrasive particles to the backing.

Suitable abrasive particles include any abrasive particles known in the abrasive art. Exemplary useful abrasive particles include fused aluminum oxide based materials such as aluminum oxide, ceramic aluminum oxide (which may include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, sol-gel derived abrasive particles, and blends thereof. Preferably, the abrasive particles comprise fused aluminum oxide, heat-treated aluminum oxide, ceramic aluminum oxide, silicon carbide, alumina zirconia, garnet, diamond, cubic boron nitride, sol-gel derived abrasive particles, or mixtures thereof.

The abrasive particles may be in the form of, for example, individual particles, abrasive composite particles, agglomerates (including erodible agglomerates), and mixtures thereof (e.g., having the same or different size and/or composition).

The abrasive particles typically have an average diameter of from about 0.1 micrometers to about 2000 micrometers, more preferably from about 1 micrometers to about 1300 micrometers, although other particles having other diameters can be used. Coating weights for the abrasive particles may depend on, for example, the type of abrasive article (e.g., coated abrasive article or nonwoven abrasive article), the process for applying the abrasive particles, and the size of the abrasive particles, but typically range from about 5 grams per square meter (g/m$^2$) to about 1350 g/m$^2$.

In one exemplary embodiment of a coated abrasive article, the abrasive coat may comprise a make coat, optional size coat, and abrasive particles. Referring now to FIG. 1, exemplary coated abrasive article 100 has backing 120 and abrasive coat 130 according to the present invention. Abrasive coat 130, in turn, includes abrasive particles 140 secured to major surface 170 of backing 120 by make coat 150 and optional size coat 160.

In making such a coated abrasive article, a make coat comprising a first binder precursor is applied to a major surface of the backing. Abrasive particles are then at least partially embedded into the make coat (e.g., by electrostatic coating), and the first binder precursor is at least partially cured to secure the particles to the make coat. If utilized, an optional size coat comprising a second binder precursor (which may be the same or different from the first binder precursor) is then applied over the make coat and abrasive particles, followed by curing the binder precursors.

Optionally, coated abrasive articles may further comprise, for example, a backsize (i.e., a coating on the major surface of the backing opposite the major surface having the abrasive coat), a presize or a tie layer (i.e., a coating between the abrasive coat and the major surface to which the abrasive coat is secured), and/or a saturant which coats both major surfaces of the backing. Coated abrasive articles may further comprise a supersize covering the abrasive coat. If present, the supersize typically includes grinding aids and/or anti-loading materials.

Figure 2:
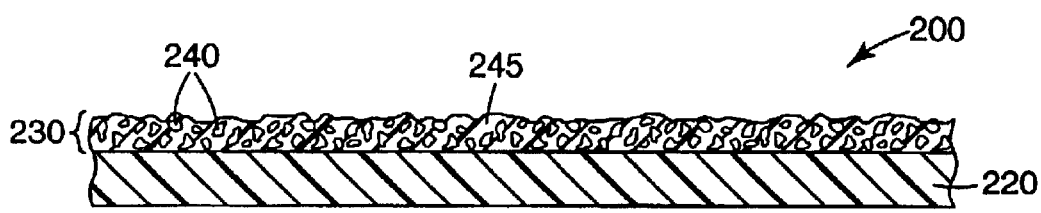

In another exemplary embodiment of a coated abrasive article according to the present invention, the abrasive coat may comprise a cured slurry of a binder precursor and abrasive particles. Referring to FIG. 2, exemplary coated abrasive article 200 has backing 220 and abrasive coat 230. Abrasive coat 230, in turn, includes abrasive particles 240 and binder 245 according to the present invention.

In making such a coated abrasive article, a slurry comprising a first binder precursor and abrasive particles is typically applied to a major surface of the backing, and the binder precursor is then at least partially cured. Curable compositions according to the present invention may be included in binder precursors used to prepare one or more of the abovementioned layers and coatings of coated abrasive articles.

Coated abrasive articles according to the present invention may be converted, for example, into belts, rolls, discs (including perforated discs), and/or sheets. For belt applications, two free ends of the abrasive sheet may be joined together using known methods to form a spliced belt.

Further description of techniques and materials for making coated abrasive articles may be found in, for example, U.S. Pat. No. 4,314,827 (Leitheiser et al.); U.S. Pat. No. 4,518,397 (Leitheiser et al.); U.S. Pat. No. 4,588,419 (Caul et al.); U.S. Pat. No. 4,623,364 (Cottringer et al.); U.S. Pat. No. 4,652,275 (Bloecher et al.); U.S. Pat. No. 4,734,104 (Broberg); U.S. Pat. No. 4,737,163 (Larkey); U.S. Pat. No. 4,744,802 (Schwabel); U.S. Pat. No. 4,751,137 (Tumey et al.); U.S. Pat. No. 4,770,671 (Monroe et al.); U.S. Pat. No. 4,799,939 (Bloecher et al.); U.S. Pat. No. 4,881,951 (Wood et al.); U.S. Pat. No. 4,927,431 (Buchanan et al.); 5,498,269 (Larmie); U.S. Pat. No. 5,011,508 (Wald et al.); U.S. Pat. No. 5,078,753 (Broberg et al.); U.S. Pat. No. 5,090,968 (Pellow); U.S. Pat. No. 5,108,463 (Buchanan et al.); U.S. Pat. No. 5,137,542 (Buchanan et al.); U.S. Pat. No. 5,139,978 (Wood); U.S. Pat No. 5,152,917 (Pieper et al.); U.S. Pat. No. 5,201,916 (Berg et al.); U.S. Pat. No. 5,203,884 (Buchanan et al.); U.S. Pat. No. 5,227,104 (Bauer); U.S. Pat. No. 5,328,716 (Buchanan); U.S. Pat. No. 5,366,523 (Rowenhorst et al.); U.S. Pat. No. 5,378,251 (Culler et al.); U.S. Pat. No. 5,417,726 (Stout et al.); U.S. Pat. No. U.S. Pat. No. 5,429,647 (Larmie); U.S. Pat. No. 5,436,063 (Follett et al.); U.S. Pat. No. 5,490,878 (Peterson et al.); U.S. Pat. No. 5,492,550 (Krishnan et al.); U.S. Pat. No. 5,496,386 (Broberg et al.); U.S. Pat. No. 5,520,711 (Helmin); 5,549,962 (Holmes et al.); U.S. Pat. No. 5,551,963 (Larmie); U.S. Pat. No. 5,556,437 (Lee et al.); U.S. Pat. No. 5,560,753 (Buchanan et al.); U.S. Pat. No. 5,573,619 (Benedict et al.); U.S. Pat. No. 5,609,706 (Benedict et al.); U.S. Pat. No.

5,672,186 (Chesley et al.); U.S. Pat. No. 5,700,302 (Stoetzel et al.); U.S. Pat. No. 5,942,015 (Culler et al.); 5,954,844 (Law et al.); U.S. Pat. No 5,961,674 (Gagliardi et al.); U.S. Pat. No. 5,975,988 (Christianson); U.S. Pat. No. 6,059,850 (Lise et al.); and U.S. Pat. No. 6,261,682 (Law), the disclosures of which are incorporated herein by reference.

Figure 3A:
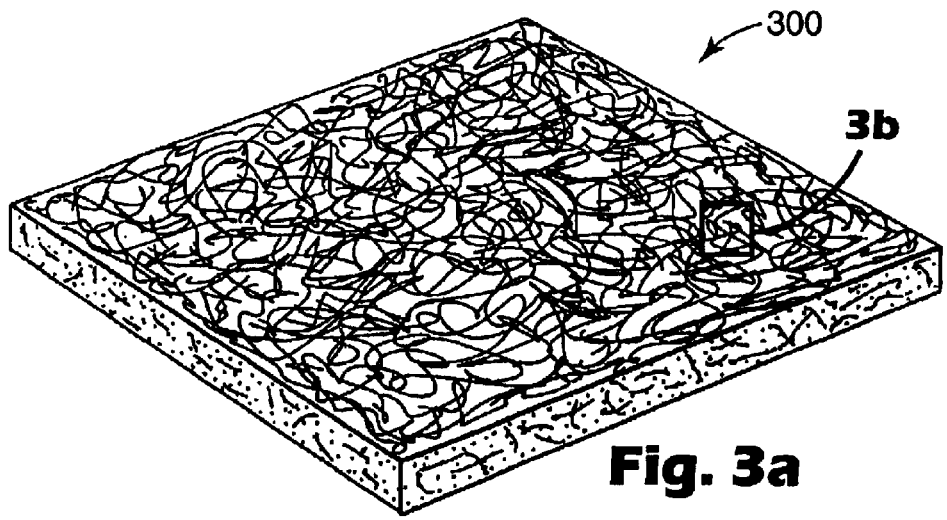
FIG. 3a is a perspective view of an exemplary nonwoven abrasive article according to the present invention.
Figure 3B:
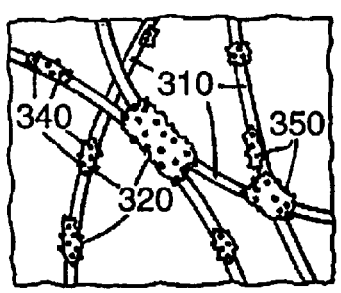

Nonwoven abrasive articles typically include a porous (e.g., a lofty open porous) polymer filament structure having abrasive particles bonded thereto by a binder. An exemplary embodiment of a nonwoven abrasive article according to the present invention is shown in FIGS. 3a and 3b, wherein lofty open low-density fibrous web 300 is formed of entangled filaments 310 impregnated with binder 320 according to the present invention. Abrasive particles 340 are dispersed throughout fibrous web 300 on exposed surfaces of filaments 310. Binder resin 320 uniformly coats portions of filaments 310 and forms globules 350 which may encircle individual filaments or bundles of filaments, adhere to the surface of the filament and/or collect at the intersection of contacting filaments, providing abrasive sites throughout the nonwoven abrasive article.

The fiber web may comprise continuous filaments (e.g., a spunbond fiber web) and/or staple fibers that may be crimped and/or entangled with one another. Exemplary fibers include polyester fibers, polyamide fibers, and polyaramid fibers.

The fiber web may, optionally, be affixed (i.e., secured) to a backing, for example, by needletacking, stitchbonding, and/or adhesive bonding (e.g., using glue or a hot melt adhesive).

Binders and binder precursors (including curable compositions according to the present invention), backings, abrasive particles, optional additives, and optional layers set forth hereinabove for inclusion in coated abrasive articles may also be utilized in nonwoven abrasives according to the present invention.

Nonwoven abrasive articles according to the invention may be converted to a variety of useful forms including, for example, sheets, discs, belts, rolls, wheels, hand pads, cleaning brushes, and blocks.

Further description of techniques and materials for making nonwoven abrasive articles may be found in, for example, U.S. Pat. No. 2,958,593 (Hoover et al.); U.S. Pat. No. 4,018,575 (Davis et al.); U.S. Pat. No. 4,227,350 (Fitzer); U.S. Pat. No. 4,331,453 (Dau et al.); U.S. Pat. 4,609,380 (Barnett et al.); U.S. Pat. No. 4,991,362 (Heyer et al.); U.S. Pat. No. 5,554,068 (Carr et al.); U.S. Pat. No. 5,712,210 (Windisch et al.); U.S. Pat. No. 5,591,239 (Edblom et al.); U.S. Pat. No. 5,681,361 (Sanders); U.S. Pat. No. 5,858,140 (Berger et al.); U.S. Pat. No. 5,928,070 (Lux); U.S. Pat. No. 6,017,831 (Beardsley et al.); U.S. Pat. No. 6,207,246 (Moren et al.); and U.S. Pat. No. 6,302,930 (Lux), the disclosures of which are incorporated herein by reference.

Figure 4:
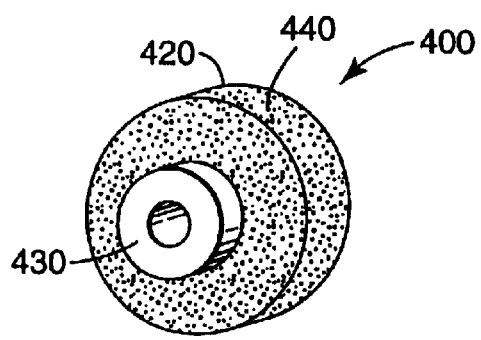
FIG. 4 is a perspective view of an exemplary bonded abrasive article according to the present invention.

Bonded abrasive articles typically include a shaped mass of abrasive particles held together by a binder. Referring now to FIG. 4, an exemplary embodiment of a bonded abrasive article according to the present invention has the form of grinding wheel 400, wherein abrasive particles 440 are held together by binder 420 according to the present invention to form a shaped mass mounted on hub 430.

In one method, bonded abrasive articles may be formed by preparing a mixture of abrasive particles in a binder precursor, shaping the mixture (e.g., using a mold), and curing the binder precursor to form a binder. In one embodiment according to the present invention (e.g., a vitreous bonded abrasive article), the binder may be subsequently removed by pyrolysis.

Bonded abrasive articles according to the present invention may have any form useful as an abrasive article such as, for example, a wheel (e.g., grinding wheel, polishing wheel, cutoff wheel), a honing stone, a belt, mounted points, or other conventional bonded abrasive shape.

Further details regarding bonded abrasive articles may be found in, for example, U.S. Pat. No. 4,800,685 (Haynes et al.); U.S. Pat. No. 4,898,597 (Hay et al.); U.S. Pat. No. 4,933,373 (Moren); U.S. Pat. No. 5,282,875 (Wood et al.), the disclosures of which are incorporated herein by reference.

Curable compositions according to the present invention are also useful as binder precursors for the preparation of abrasive brushes such as flap brushes as described, for example, in U.S. Pat. No. 5,554,068 (Carr et al.), and unitary brushes as described, for example, in U.S. Pat. Publication 2002/0065031A1 (Chou et al.), published May 30, 2002, the disclosures of which are incorporated herein by reference.

Figure 5:
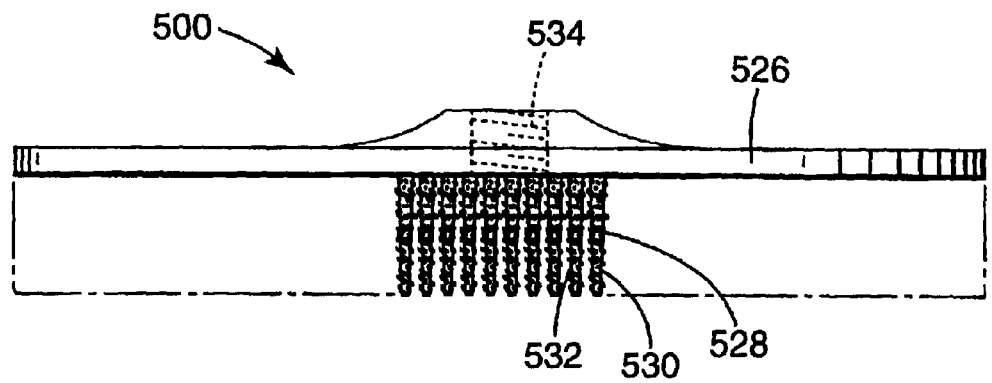
FIG. 5 is a side view of an exemplary unitary brush according to the present invention.

One exemplary embodiment of a unitary brush according to the present invention is illustrated in FIG. 5. Referring to FIG. 5, cup brush 500 has base 526 and bristles 528 attached at a right angle to base 526. Abrasive particles 530 are adhered to bristles 528 via binder 532 according to the present invention. Base 526 has hole 534 in the center thereof, which is threaded, for example, to allow for easy attachment to a rotary hand tool.

Figure 6:
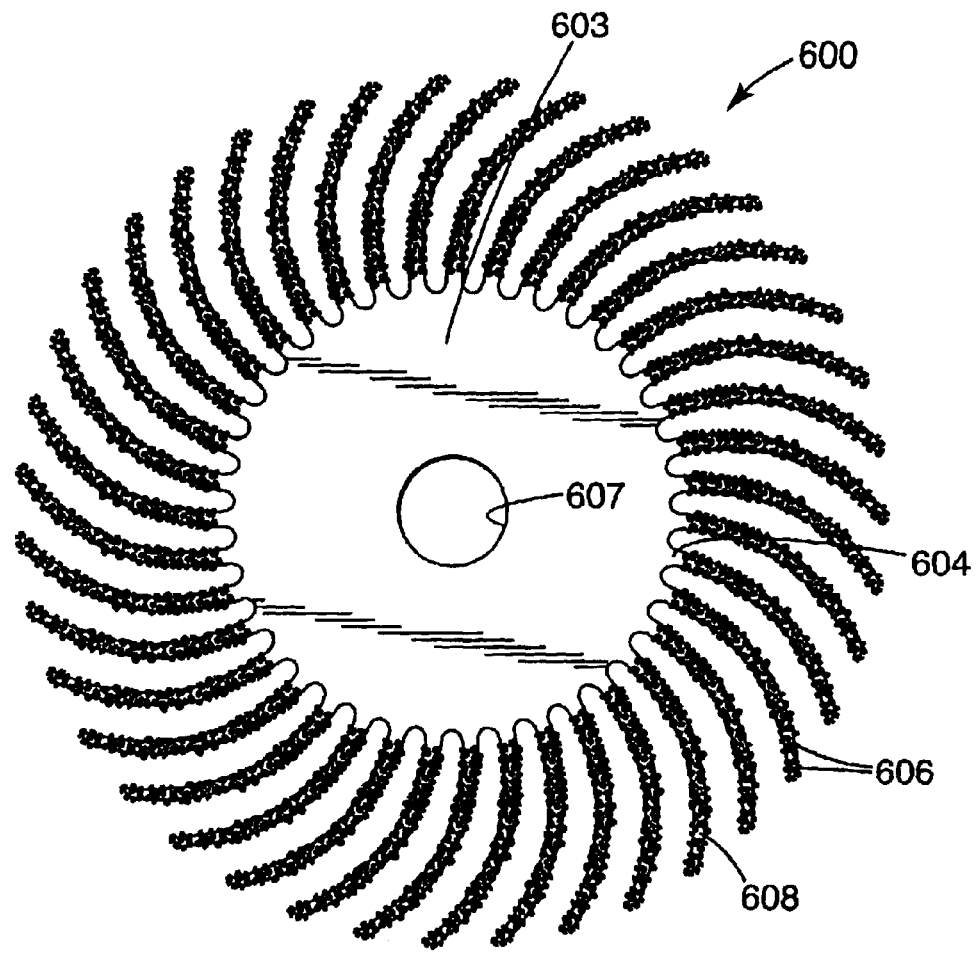
FIG. 6 is a front plan view of another exemplary unitary brush according to the present invention.

Another exemplary embodiment of a unitary brush according to the present invention is illustrated in FIG. 6. Referring to FIG. 6, radial brush 600 has central hub base 603 having bristles 604 extending outwardly therefrom. Central hub 603 has hole 607 in the center thereof. Bristles 604 have abrasive particles 606 adhered thereto via binder 608 according to the present invention. Radial brushes according to the present invention may be used individually or ganged together.

To enhance the life of unitary brushes, binders according to the present invention that are in contact with bristles may have a flexural modulus, as measured according to ASTM Test Method D790-02 "Standard Test Methods for Flexural Properties of Unreinforced and Reinforced Plastics and Electrical Insulating Materials" (2002), that is similar to (e.g., within 20 percent of) the flexural modulus of the bristles.

Curable compositions according to the present invention may be foamed and used to prepare foraminous abrasive articles as described in, for example, U.S. Pat. No. 6,007,590 (Sanders), the disclosure of which is incorporated herein by reference.

Abrasive articles according to the present invention are useful for abrading a workpiece. Methods for abrading with abrasive articles according to the present invention range from snagging (i.e., high pressure high stock removal) to polishing (e.g., polishing medical implants with coated abrasive belts), wherein the latter is typically done with finer grades (e.g., less ANSI 220 and finer) of abrasive particles. One such method includes the step of frictionally contacting an abrasive article (e.g., a coated abrasive article, a nonwoven abrasive article, or a bonded abrasive article) with a surface of the workpiece, and moving at least one of the abrasive article or the workpiece relative to the other to abrade at least a portion of the surface.

Examples of workpiece materials include metal, metal alloys, exotic metal alloys, ceramics, glass, wood, wood-like materials, composites, painted surfaces, plastics, reinforced plastics, stone, and/or combinations thereof. The workpiece may be flat or have a shape or contour associated with it. Exemplary workpieces include metal components, plastic components, particleboard, camshafts, crankshafts, furniture, and turbine blades. The applied force during abrading typically ranges from about 1 kilogram to about 100 kilograms.

Abrasive articles according to the present invention may be used by hand and/or used in combination with a machine. At least one or both of the abrasive article and the workpiece is moved relative to the other when abrading.

Abrading may be conducted under wet or dry conditions. Exemplary liquids for wet abrading include water, water containing conventional rust inhibiting compounds, lubricant, oil, soap, and cutting fluid. The liquid may also contain defoamers, degreasers, and/or the like.

The present invention will be more fully understood with reference to the following non-limiting examples in which all parts, percentages, ratios, and so forth, are by weight unless otherwise indicated.

EXAMPLES

Unless otherwise noted, all reagents used in the examples were obtained, or are available from, general chemical suppliers such as Aldrich Chemical Co., Milwaukee, Wis., or may be synthesized by known methods.

The following abbreviations are used throughout the Examples:

| | |
|---|---|
| PU1 | Ketoxime-blocked poly(1,4-butylene glycol) diisocyanate, 100% solids commercially available under the trade designation "ADIPRENE BL-16" from Crompton & Knowles Corporation, Stamford, Connecticut |
| PU2 | Ketoxime-blocked poly(1,4-butylene glycol) diisocyanate, 85% solids in propylene glycol monomethyl ether acetate commercially available under the trade designation "ADIPRENE BL-31" from Crompton & Knowles Corporation |
| C1 | A solution of 35 parts 4,4'-methylenedianiline in 65 parts ethylene glycol monoethyl ether acetate |
| C2 | Bis(4-amino-3,5-diethylphenyl)methane commercially available under the trade designation "LONZACURE M-DEA" from Lonza AG, Werke, Switzerland |
| S1 | Ethoxylated sorbitan ester commercially available under the trade designation "TWEEN 80" from Uniqema, New Castle, Delaware |
| PAA 1 | A crosslinked copolymer of acrylic acid and long chain ($C_{10}$–$C_{30}$) alkyl acrylates commercially available under the trade designation "PEMULEN 1622" from Noveon, Cleveland, Ohio |
| Lampblack | Carbon black pigment obtained under the trade designation "RAVEN 16" from Columbian Chemical Company, St. Louis, Missouri |
| Silane | Glycidoxypropyl trimethoxysilane coupling agent (>60 percent by weight purity) obtained under the trade designation "Z-6040 SILANE" from Dow-Corning Corporation, Midland, Michigan |
| LiSt | Lithium stearate obtained under the trade designation "LITHIUM STEARATE 306" obtained from Witco Chemical Corporation, Perth Amboy, New Jersey, prepared and used at 44 percent by weight solids in propylene glycol monomethyl ether acetate |
| Solvent 1 | Propylene glycol monomethyl ether acetate obtained under the trade designation "ARCOSOLV PM ACETATE" from Arco Chemical Company, Houston, Texas |
| Solvent 2 | Xylene, ten degree from Ashland Chemical Company, Cranbury, New Jersey |

Tensile Test

Tensile properties were evaluated according to ASTM Test Method D 638-02, "Standard Test Method for Tensile Properties of Plastics", the disclosure of which is incorporated herein by reference, and which gives a comprehensive listing of tensile properties, testing procedures, and property calculations. Five Dumbbell-shaped specimens of dimensions W=0.125 inch (3.8 mm)×LO=2.062 inches (52.4 mm)×WO =0.562 inch (14.3 mm) were die-cut from each film sample, where W is the width of the narrow section of the dumbbell, LO is the overall length of the specimen, and WO is the overall length of the specimen. Each dumbbell was clamped into a constant rate of extension tensile testing machine having the trade designation "SINTECH 2 " and equipped with a 200 lb load cell available from MTS Systems Corporation, Cary, N.C. Data acquisition, tensile property calculations, and machine control was performed using software available from MTS Systems Corporation, Cary, N.C. under the trade designation "TESTWORKS VERSION 2.1". The gage length was 1.0 inch (2.54 cm), the strain rate was set to 1.0 inch/minute (2.54 cm/min), and the specimen gripping surface was serrated and 2 inches (5 cm) wide×1.5 inches (3.8 cm) long. Test results reported are the statistical average of 10 measurements of a single film.

General Method for Film Preparation—Friction Test

Films for subsequent friction testing were prepared on steel plates (phosphate coated, 4 inches×12 inches×0.030 inch (10.1×30.5 cm×0.76 mm)). Each film was prepared by knife coating the specified composition at a wet thickness of 0.010 inch (0.25 mm), allowing it to air dry for 2 hours, and then placing it in a convection oven at 250 ° F. (121 ° C.) for 18 hours. Each film was then allowed to cool to room temperature prior to friction measurements at various temperatures.

Friction Test

Coefficients of friction were determined using a Thwing-Albert Friction/Peel Tester Model No. 225-1 (Thwing-Albert Instrument Company, Philadelphia, Pa.) that was equipped with a 2000-gram load cell and a variable temperature platen cooled to 15 ° C.). Measurements were made by pulling a steel bar weighing 500 grams (g) and having a 2 inch×2 inch (5.1 cm×5.1 cm) sliding contact face across a film specimen at 2.1 inches/min (5.6 cm/min). Three measurements of coefficient of static friction (i.e., SF), and coefficient of kinetic friction (i.e., KF), were made for each specimen and reported as an average value.

Cut and Wear Test

Abrasive articles comprising the inventive compositions were tested according to the Cut and Wear test. Each test specimen consisted of three 10-inch (25.4 cm) diameter discs with 2-inch (5.08 cm) diameter center holes that were cut from the nonwoven abrasive article to be tested. The three discs were mounted on a 2-inch (5.08) diameter driven shaft with spacers (6 inches (15.24 cm) outer diameter×2 inches (5.08 cm) inner diameter×½ inch (1.27 cm) thick) between each pair of discs. Three such test specimens were prepared for each nonwoven abrasive article to be tested. Each test specimen was evaluated for abrasiveness against an 11 inch (28 cm)×4 inch (10 cm)×0.056 inch (1.4 mm) perforated carbon steel screen workpiece (5/32 inch (0.40 cm) hole diameter on 7/32 inch (0.56 cm)) centers staggered pattern on 1008 cold rolled steel, stock pattern 401 obtained from Harrington & King Company, Chicago, Ill. Test specimens were rotated at 6000 ft/min (1829 m/min) and urged against a workpiece at 20 psi (0.14 MPa) force for one minute. A new workpiece was mounted and the abrading cycle was repeated. The before-test weight and the after-test weight of both the test specimen and the two workpieces were recorded. Test specimen weight loss was recorded as "wear". The combined weight loss of both workpieces was recorded as "cut".

EXAMPLES 1–8 and COMPARATIVE EXAMPLES A–D

The compositions of Examples 1–8 and Comparative Examples A–D were prepared by combining, in the amounts indicated in Table 1 (below), PU1 and solvent borne curative (i.e., C1 or C2 dissolved in Solvent 1), which were stirred until completely dissolved, then nonionic surfactant (S1) and/or crosslinked copolymer (PAA 1), if specified, were finally added.

TABLE 1

| | COMPOSITION, parts per hundred (weight basis) | | | | | |
|---|---|---|---|---|---|---|
| EXAMPLE | PU1 | C1 | C2 | Solvent 1 | S1 | PAA 1 |
| COMPARATIVE A | 72.4 | 25.0 | 0 | 0 | 0 | 0 |
| COMPARATIVE B | 72.4 | 25.0 | 0 | 0 | 0.8 | 0 |
| 1 | 72.4 | 25.0 | 0 | 0 | 0.8 | 0.3 |
| 2 | 72.4 | 25.0 | 0 | 0 | 0 | 0.3 |
| 3 | 72.4 | 25.0 | 0 | 0 | 0 | 3.0 |
| 4 | 72.4 | 25.0 | 0 | 0 | 0 | 15.0 |
| COMPARATIVE C | 72.4 | 0 | 13.8 | 7.3 | 0 | 0 |
| COMPARATIVE D | 72.4 | 0 | 13.8 | 7.3 | 0.9 | 0 |
| 5 | 72.4 | 0 | 13.8 | 7.3 | 0.9 | 0.3 |
| 6 | 72.4 | 0 | 13.8 | 7.3 | 0 | 0.3 |
| 7 | 72.4 | 0 | 13.8 | 7.3 | 0 | 3.0 |
| 8 | 72.4 | 0 | 13.8 | 7.3 | 0 | 15.0 |

Films were prepared from the compositions of Examples 1–8 and Comparative Examples A–D according to the General Method for Film Preparation—Friction Test, and test specimens of the prepared films were evaluated according to the Friction Test. Friction Test results are shown in Table 2 (below).

TABLE 2

| | TEMPERATURE, | AVERAGE COEFFICIENT OF FRICTION | |
|---|---|---|---|
| EXAMPLE | ° F. (° C.) | SF | KF |
| Comparative A | 60 (16) | 1.003 | 0.980 |
| Comparative B | 60 (16) | 0.642 | 0.586 |
| 1 | 60 (16) | 0.358 | 0.290 |
| 2 | 60 (16) | 0.320 | 0.281 |
| 3 | 60 (16) | 0.357 | 0.274 |
| 4 | 60 (16) | 0.312 | 0.251 |
| Comparative A | 150 (66) | 0.582 | 0.549 |
| Comparative B | 150 (66) | 0.354 | 0.313 |
| 1 | 150 (66) | 0.421 | 0.305 |
| 2 | 150 (66) | 0.439 | 0.373 |
| 3 | 150 (66) | 0.464 | 0.326 |
| 4 | 150 (66) | 0.382 | 0.284 |
| Comparative A | 225 (107) | 0.533 | 0.469 |
| Comparative B | 225 (107) | 0.318 | 0.299 |
| 1 | 225 (107) | 0.374 | 0.248 |
| 2 | 225 (107) | 0.323 | 0.216 |
| 3 | 225 (107) | 0.300 | 0.224 |
| 4 | 225 (107) | 0.238 | 0.198 |
| Comparative A | 300 (149) | 0.488 | 0.481 |
| Comparative B | 300 (149) | 0.346 | 0.327 |
| 1 | 300 (149) | 0.425 | 0.271 |
| 2 | 300 (149) | 0.346 | 0.315 |
| 3 | 300 (149) | 0.349 | 0.228 |
| 4 | 300 (149) | 0.244 | 0.186 |
| Comparative C | 60 (16) | 1.056 | 0.984 |
| Comparative D | 60 (16) | 0.959 | 0.929 |
| 5 | 60 (16) | 0.509 | 0.464 |
| 6 | 60 (16) | 0.504 | 0.528 |
| 7 | 60 (16) | 0.329 | 0.229 |
| 8 | 60 (16) | 0.296 | 0.223 |
| Comparative C | 150 (66) | 0.967 | 0.938 |
| Comparative D | 150 (66) | 0.816 | 0.796 |
| 5 | 150 (66) | 0.427 | 0.409 |
| 6 | 150 (66) | 0.386 | 0.364 |
| 7 | 150 (66) | 0.330 | 0.232 |
| 8 | 150 (66) | 0.265 | 0.202 |
| Comparative C | 225 (107) | 0.637 | 0.610 |
| Comparative D | 225 (107) | 0.559 | 0.508 |
| 5 | 225 (107) | 0.307 | 0.280 |
| 6 | 225 (107) | 0.277 | 0.225 |
| 7 | 225 (107) | 0.235 | 0.172 |
| 8 | 225 (107) | 0.236 | 0.144 |
| Comparative C | 300 (149) | 0.489 | 0.493 |
| Comparative D | 300 (149) | 0.471 | 0.468 |
| 5 | 300 (149) | 0.286 | 0.249 |
| 6 | 300 (149) | 0.248 | 0.172 |
| 7 | 300 (149) | 0.191 | 0.144 |
| 8 | 300 (149) | 0.229 | 0.136 |

EXAMPLES 9–12 and COMPARATIVE EXAMPLES E–H

A continuous filament nonwoven web was made according to the procedure of Example 1 of U.S. Pat. No. 4,227,350 (Fitzer), the disclosure of which is incorporated herein by reference. Polycaprolactam (available commercially under the trade designation "ULTRAMID B3 " from BASF Corporation, Polymers Division, Mount Olive, N.J.) was extruded at a pressure of 2800 psi (19 MPa) through a 60-inch (1.5 meter) long spinneret nominally having 2890 counter sunk, counter bored openings arranged in eight equal rows spaced 0.080 inch (0.2 cm) apart in a hexagonal close packed array, each opening having a diameter of 0.016 inch (0.4 mm), and having a land length of 0.079 inch (2.0 mm). The spinneret was heated to about 248° C. and positioned 12 inches (30 cm) above the surface of a quench bath, which was continuously filled and flushed with tap water at the rate of 0.5 gallon per minute (2 liters/min). Filaments extruded from the spinneret were permitted to fall into the quench bath, where they undulated and coiled between two 4-inch (10 cm) diameter by 60-inch (1.5 m) long smooth-surfaced rolls. Both rolls were positioned in the bath with their axes of rotation about 2 inches (5 cm) below the surface of the bath, and the rolls were rotated in opposite directions at a rate of about 9 ft/min (2.7 m/min) surface speed. The rolls were spaced to lightly compress the surfaces of the resultant extruded web, providing a flattened surface on both sides. The polycaprolactam was extruded at a rate of about 700 pounds per hour (320 kg/hr), producing a web that was 59 inches (1.5 m) wide×0.66 inch (17 mm) thick. The web had eight rows of coiled, undulated filaments. The resulting coiled web had a basis weight of 14.2 grams/24 square inches (0.875 kg/m$^2$), and had a void volume of 92.6 percent by volume. The filament diameter averaged about 15 mils (0.38 mm). The web was carried from the quench bath around one of the rolls and excess water was removed from the web by drying at room temperature (i.e., 20 ° C. to 24° C.) using forced air.

The nonwoven web prepared above was used to make Examples 9–12 and Comparative Examples E–H by sequentially applying a make coat, mineral coat, and size coat, as described below.

A make coat, obtained by combining the ingredients shown in Table 3 (below), was applied to the nonwoven web using a 2-roll coater.

TABLE 3

| Component | Comparative Example E, parts | Example 9, parts | Comparative Example F, parts | Example 10, parts | Example 11, parts | Comparative Example G, parts | Comparative Example H, parts | Example 12, parts |
|---|---|---|---|---|---|---|---|---|
| C1 | — | — | 25.0 | 25.0 | 25.0 | 25.0 | — | — |
| C2 | 13.8 | 13.8 | — | — | — | — | 13.8 | 13.8 |
| PU1 | 72.4 | 72.4 | 72.4 | 72.4 | 72.4 | 72.4 | 72.4 | 72.4 |
| S1 | — | — | 0.8 | — | 0.8 | — | 0.9 | 0.9 |
| PAA 1 | — | 0.3 | — | 0.3 | 0.3 | — | — | 0.3 |
| Solvent 1 | 7.3 | 7.3 | — | — | — | — | 14 | 14 |

The indicated make coat was applied at a dry add-on weight of 6.5 g/24 in$^2$ (0.420 kg/m$^2$). Grade 36 SiC abrasive granules (2.6 kg/m$^2$) were then applied to the coated web via a drop coater. The web was agitated to encourage penetration of the granules into the interstitial spaces of the web. The particle-coated web was then heated by passing it through a 90 ft (27 m) long oven. A size coat consisting of 9.6 parts C1, 27.5 parts PU1, 27.5 parts PU2, 1.2 parts lampblack, 0.7 parts silane, 19.3 parts Solvent 2, and 4.7 parts LiSt was then sprayed on the upper side of the web, which was then heated in an oven. The web was inverted and the other side was sprayed with an identical amount of the size coating and heated in an oven under the same conditions. The final size coat dry add-on was 7.78 g/24 in$^2$ (0.503 kg/m$^2$). Discs ((10-inch (25.4mm) outer diameter, 2-inch (5.1mm) inner diameter) were cut from the resulting nonwoven abrasive articles and were tested according to the Wear Test. Curing conditions used for the make and size coatings, and Wear Test results are reported in Table 4 (below).

What is claimed is:

1. A curable composition comprising:

blocked polyisocyanate;

curative; and a crosslinked copolymer of monomers comprising at least one free-radically polymerizable carboxylic acid and at least one of an alkyl or alkaryl(meth)acrylate, wherein at least one of the alkyl or alkaryl (meth)acrylate has from 11 carbon atoms to 34 carbon atoms, and wherein the amount of crosslinked copolymer is in a range of from 1 percent by weight to 20 percent by weight, based on the total weight of the composition.

2. A curable composition according to claim 1, further comprising organic solvent.

3. A curable composition according to claim 1, wherein the monomers comprise acrylic acid.

4. A curable composition according to claim 1, wherein the monomers comprise acrylic acid and an alkyl acrylate,

TABLE 4

| EXAMPLE | MAKE COAT CURE TEMP, °C. | MAKE COAT LINE SPEED, ft/min (m/min) | NUMBER OF MAKE COAT OVEN PASSES | SIZE COAT CURE TEMP, °C. | SIZE COAT LINE SPEED, ft/min (m/min) | WEAR, g/2 min | CUT, g/2 min |
|---|---|---|---|---|---|---|---|
| Comparative Example E | 165 | 10 (3.0) | 1 | 160 | 10 (3.0) | 33.6 | 18.39 |
| 9 | 165 | 10 (3.0) | 1 | 160 | 10 (3.0) | 44.2 | 22.52 |
| Comparative Example F | 165 | 10 (3.0) | 1 | 160 | 10 (3.0) | 72.9 | 21.43 |
| 10 | 165 | 10 (3.0) | 1 | 160 | 10 (3.0) | 72.8 | 22.42 |
| 11 | 165 | 10 (3.0) | 1 | 160 | 10 (3.0) | 84.5 | 23.03 |
| Comparative Example G | 165 | 10 (3.0) | 1 | 160 | 10 (3.0) | 83.3 | 21.79 |
| Comparative Example H | 165 | 10 (3.0) | 1 | 160 | 10 (3.0) | 44.8 | 23.2 |
| 12 | 165 | 10 (3.0) | 1 | 160 | 10 (3.0) | 53.4 | 25.1 |

Various modifications and alterations of this invention will become apparent to those skilled in the art without departing from the scope and spirit of this invention, and it should be understood that this invention is not to be unduly limited to the illustrated embodiments set forth herein.

further wherein the alkyl acrylate has from 13 carbon atoms to 33 carbon atoms.

5. A curable composition according to claim 1, wherein the blocked polyisocyanate comprises a compound having the formula:

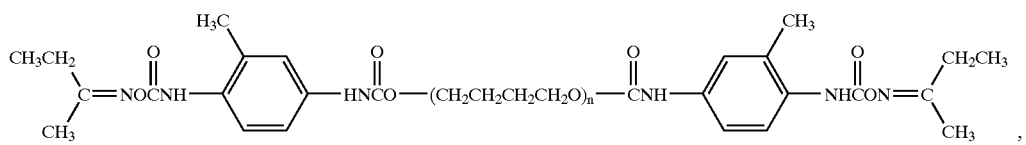

wherein n is an integer greater than or equal to 1.

6. A curable composition according to claim 1, wherein the curative comprises at least one of bis(4-amino-3-ethylphenyl)methane or bis(4-amino-3,5-diethylphenyl) methane.

7. A curable composition according to claim 1, further comprising an additive selected from the group consisting of a filler, a lubricant, an antistatic agent, a grinding aid, and a colorant.

8. A method for making a curable composition comprising mixing components comprising:

blocked polyisocyanate;

curative; and a crosslinked copolymer of monomers comprising at least one free-radically polymerizable carboxylic acid and at least one of an alkyl or alkaryl (meth)acrylate, wherein at least one of the alkyl or alkaryl(meth)acrylate has from 11 carbon atoms to 34 carbon atoms, and wherein the amount of crosslinked copolymer is in a range of from 1 percent by weight to 20 percent by weight, based on the total weight of the composition.

9. A method according to claim 8, wherein the components further comprise abrasive particles.

10. A method according to claim 8, wherein the components further comprise organic solvent.

11. A composition according to claim 8, wherein the monomers comprise acrylic acid and an alkyl acrylate, further wherein the alkyl acrylate has from 13 carbon atoms to 33 carbon atoms.

12. A method according to claim 8, wherein the blocked polyisocyanate comprises a compound having the formula:

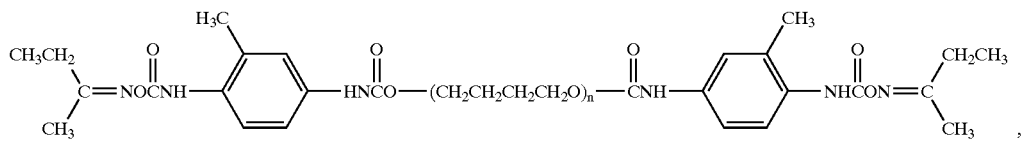

wherein n is an integer greater than or equal to 1.

13. A method according to claim 8, wherein the curative comprises at least one of bis(4-amino-3-ethylphenyl) methane or bis(4-amino-3,5-diethylphenyl)methane.

14. A composition according to claim 8, further comprising an additive selected from the group consisting of a filler, a lubricant, an antistatic agent, a grinding aid, and a colorant.

15. An abrasive article comprising abrasive particles and a polymerized reaction product of a curable composition comprising:

blocked polyisocyanate;

curative; and a crosslinked copolymer of monomers comprising at least one free-radically polymerizable carboxylic acid and at least one of an alkyl or alkaryl (meth)acrylate, wherein at least one of the alkyl or alkaryl(meth)acrylate has from 11 carbon atoms to 34 carbon atoms, and wherein the amount of crosslinked copolymer is in a range of from 1 percent by weight 20 percent by weight, based on the total weight of the composition.

16. A method according to claim 15, wherein the components further comprises abrasive particles.

17. A method according to claim 15, wherein the components further comprise organic solvent.

18. A method according to claim 15, wherein the monomers comprise acrylic acid.

19. A method according to claim 15, wherein the monomers comprise acrylic acid and an alkyl acrylate, further wherein the alkyl acrylate has from 13 carbon atoms to 33 carbon atoms.

20. A method according to claim 15, wherein the blocked polyisocyanate comprises a compound having the formula:

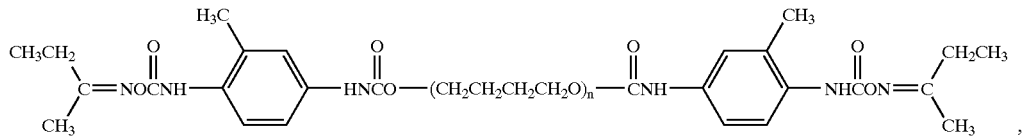

wherein n is an integer greater than or equal to 1.

21. A method according to claim 15, wherein the curative comprises at least one of bis(4-amino-3-ehtylphenyl) methane or bis(4-amino-3,5-diethylphenyl)methane.

22. A method according to claim 15, further comprising an additive selected from the group consisting of a filler, a lubricant, an antistatic agent, a grinding aid, and a colorant.

* * * * *

UNITED STATES PATENT AND TRADEMARK OFFICE
CERTIFICATE OF CORRECTION

| | | |
|---|---|---|
| PATENT NO. | : 6,979,713 B2 | Page 1 of 2 |
| APPLICATION NO. | : 10/303222 | |
| DATED | : December 27, 2005 | |
| INVENTOR(S) | : Barber, Loren L., Jr. | |

It is certified that error appears in the above-identified patent and that said Letters Patent is hereby corrected as shown below:

First Page, (56) Column 2 (Foreign Patent Documents)
Line 2, insert -- EP 0 324 334 A1 7/1989 -- below "DE 43 23 183 C1 7/1993".
Line 3, insert -- EP 0 626 401 A1 11/1994 -- below "EP 0 653 468 A2 5/1995".
Line 8, insert -- WO 93/07 195 4/1993 -- below "JP 11-207639 8/1999".
Line 9, insert -- WO 95/307 19 11/1995 -- below "WO 94/26468 11/1994".
Line 10, insert -- WO 00/15390 3/2000 -- below "WO 00/39181 7/2000".

Page 2, (56) Column 1 (U.S. Patent Documents)
Line 53, insert -- 5,739,216 4/1998 Duecoffre et al. -- below "5,712,210 A 1/1998 Windisch et al.".

Page 2, (56) Column 1 (U.S. Patent Documents)
Line 53, insert -- 5,747,166 5/1887 Schwarte et al. -- above "5,807,915 A 9/1998 Mikuni et al.".

Page 2, (56) Column 2, (Other Publications)
Line 3, insert -- Product Information: "ADIPRENE BL-16", Adiprene Vibrathane polyurethane elastomers, Uniroyal Chemical, pp. 1-4, prior to August 8, 2002.
Product Data: "ADIPRENE BL-16", Water Emulsifiable/Dispersible Reactive Prepolymer, Crompton Uniroyal Chemical, pp. 1-4, August 8, 2002. -- below "2002.".
Line 11, insert -- : -- following "information".
Lines 42-43, delete "Emulsifiers" and insert -- Emulsifier -- in place thereof.
Line 43, delete "in" and insert -- In -- in place thereof.

Page 2, (56) Column 2 (Other Publications)
Line 56, insert -- RISER ET AL., "Evaluation of Butyl Stearate Butyl Oleate, Butyl Ricinoletate, and Methyl Linoleate as Poly(vinyl Chloride) Plasticizers", The Journal of the American Oil Chemists' Society, 1964, pages 172-174, Vol. 41, The American Oil Chemists Society, Chicago, IL -- below "1963.".

Column 11
Line 23, delete "Milwaukec," and insert -- Milwaukee - in place thereof.

Column 17
Lines 11-12, Claim 8, delete "A method for making a curable composition comprising mixing components comprising:" and insert -- A composition comprising a polymerized reaction product of components comprising: -- in place thereof.
Lines 24-25, Claim 9, delete "A method according to claim 8 wherein the components further comprise abrasive particles." And insert -- A composition according to claim 8, further comprising organic solvent. -- in place thereof.

UNITED STATES PATENT AND TRADEMARK OFFICE
CERTIFICATE OF CORRECTION

PATENT NO.        : 6,979,713 B2
APPLICATION NO.   : 10/303,222
DATED             : December 27, 2005
INVENTOR(S)       : Barber, Loren L., Jr.

It is certified that error appears in the above-identified patent and that said Letters Patent is hereby corrected as shown below:

Lines 26-27, Claim 10, delete "A method according to claim 8, wherein the components further comprise organic solvent." Insert -- A composition according to claim 8, wherein the monomers comprise acrylic acid. -- in place thereof.
Line 32, Claim 12, delete "method" and insert -- composition -- in place thereof.
Line 60, Claim 13, delete "method" and insert -- composition -- in place thereof.

Column 18
Lines 1-3, Claim 15, delete "An abrasive article comprising abrasive particles and a polymerized reaction product of a curable composition comprising" and insert -- A method for making a curable composition comprising mixing components comprising: -- in place thereof.
Line 21, Claim 16, delete "comprises" and insert -- comprise -- in place thereof.

Signed and Sealed this

Fifteenth Day of August, 2006

JON W. DUDAS
*Director of the United States Patent and Trademark Office*